United States Patent Office 2,954,002
Patented Sept. 27, 1960

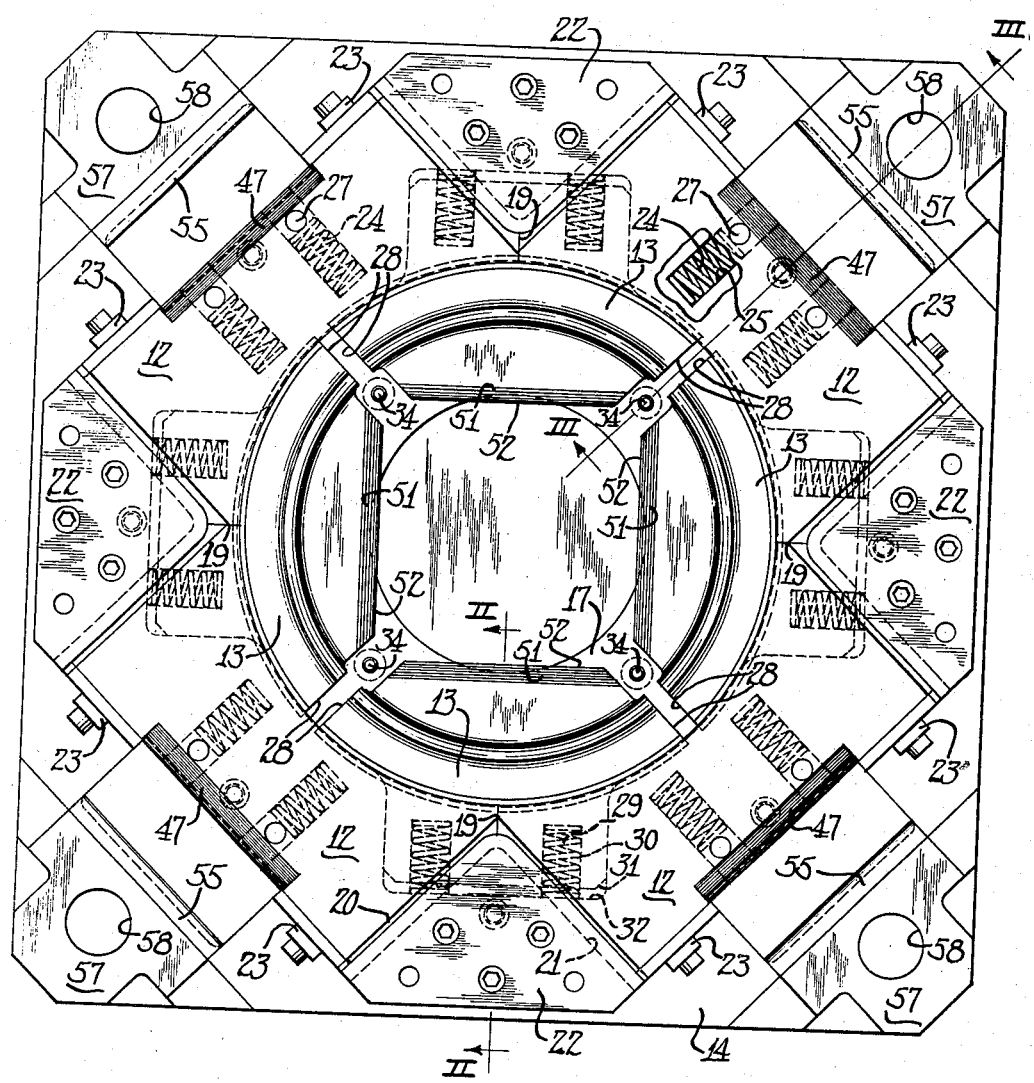

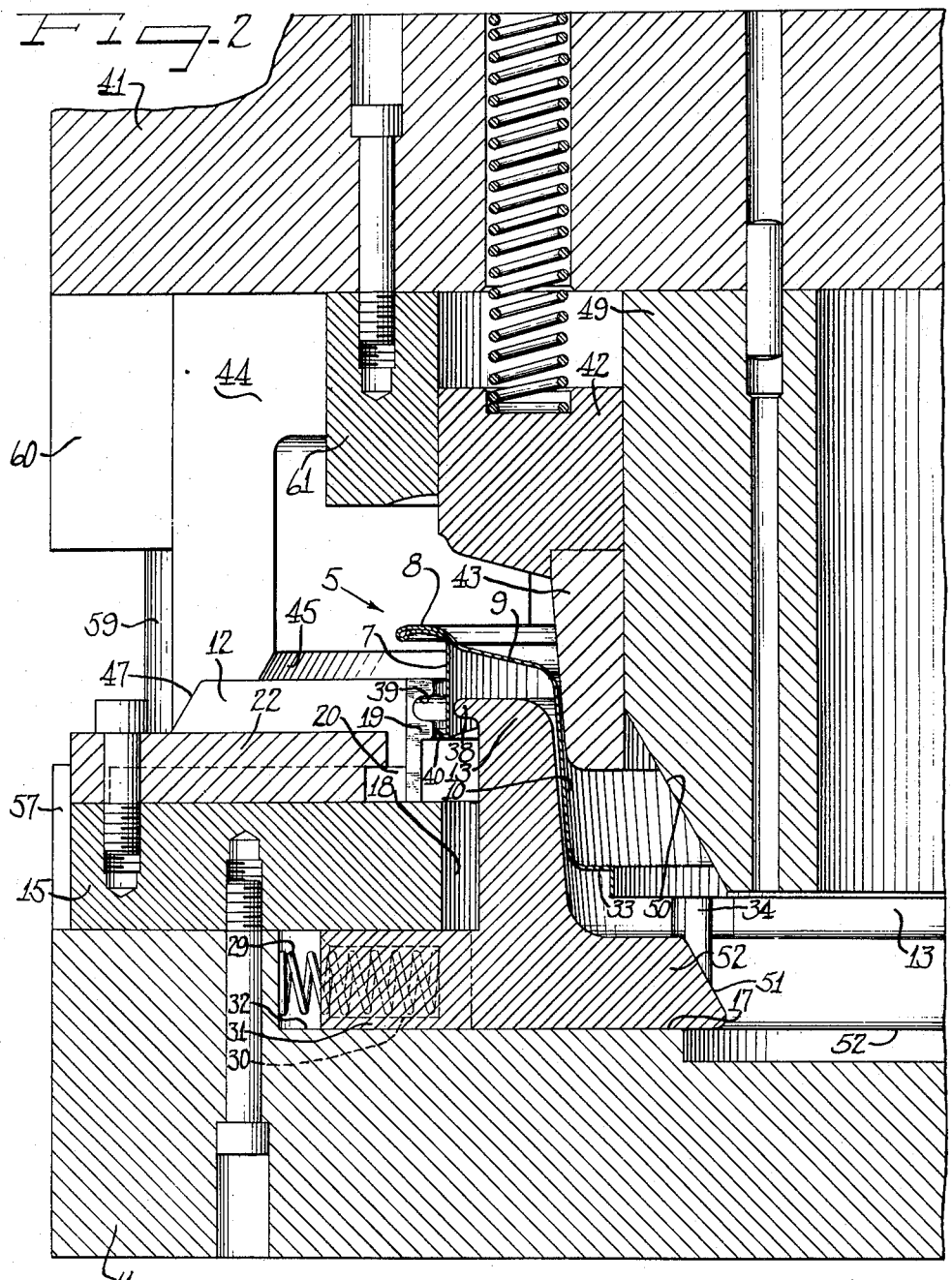

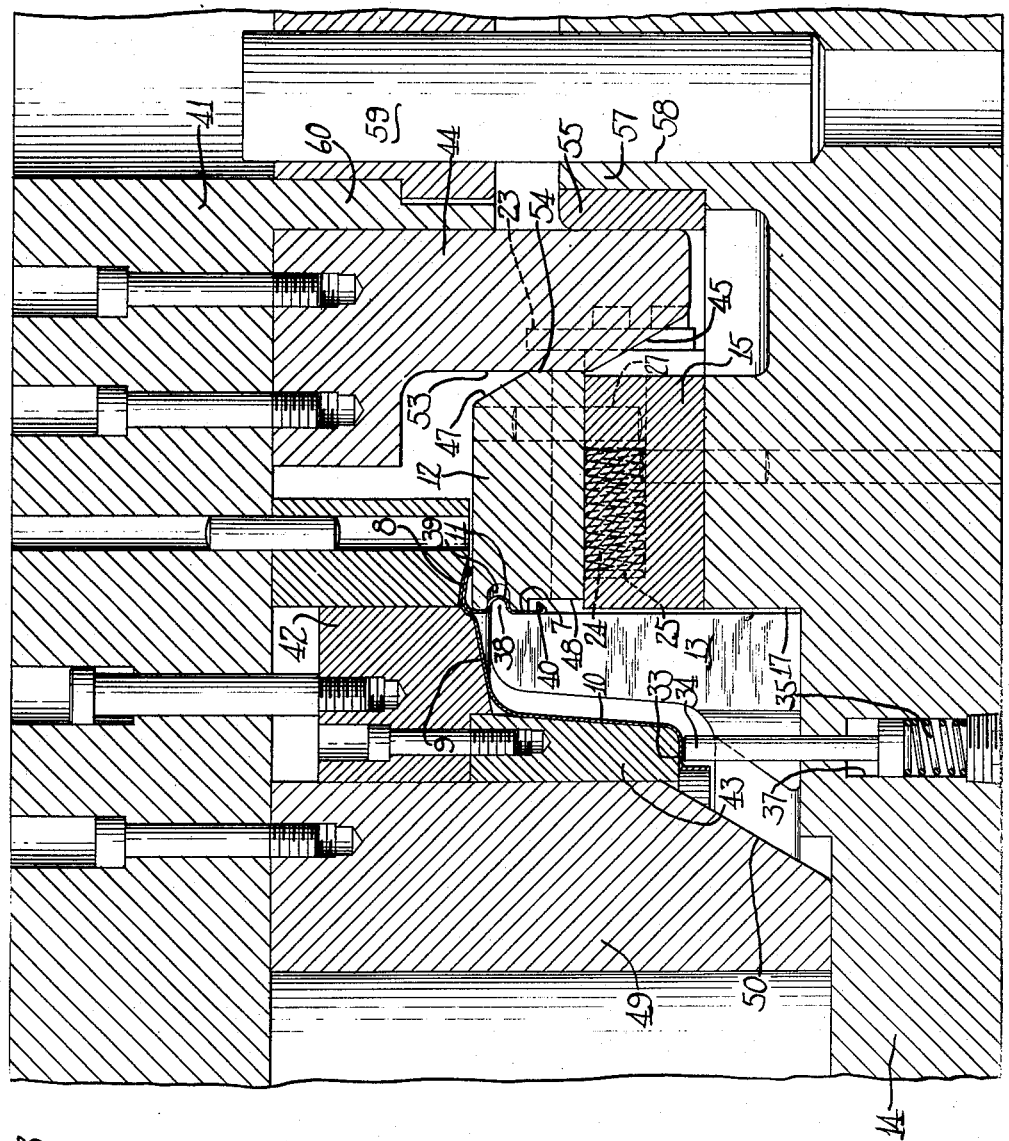

2,954,002

APPARATUS FOR MAKING WHEEL COVERS

George Albert Lyon, Detroit, Mich.

Filed Jan. 3, 1956, Ser. No. 556,861

3 Claims. (Cl. 113—48)

The present invention relates to apparatus for making wheel covers from sheet metal and more particularly concerns apparatus for forming such wheel covers with novel retaining means by which the covers are supported on vehicle wheels.

An important object of the present invention is to provide improved means to form marginal flange structure of sheet metal vehicle wheel covers.

A further object of the invention is to provide novel means for working a wheel cover retaining flange to provide the same with an annular rib for re-enforcing the flange.

Still another object of the invention is to provide novel means for shaping a sheet metal wheel cover retaining flange with outwardly projecting rib formation within limited space or clearance conditions.

Other objects, features and advantages of the present invention will be readily apparent from the following detailed description of a preferred embodiment thereof taken in conjunction with the accompanying drawings, in which:

Figure 1 is a top plan view, partially in section, of a die apparatus especially suitable for practicing the present invention;

Figure 2 is an enlarged fragmentary sectional view taken substantially on the line II—II of Figure 1; and Figure 3 is a fragmentary sectional detail view taken substantially on the line III—III of Figure 1.

The present invention deals with wheel covers of generally the kind produced by the method of my Patent 2,707,449 issued May 3, 1955. A cover 5 made according to such method is shown in Figures 2 and 3 herein but involves a problem not encountered in the disclosure of my said patent, namely, a satisfactory expedient for providing an unusually elongated axially inwardly extending cover retaining flange 7 (Fig. 2) behind a generally radially outwardly turned folded or collapsed marginal flange structure 8 forming the perimeter of a generally radially and axially outwardly sloping intermediate annular cover portion 9 joined to an inner circular cover body 10, with a reenforcing and seating rib 11 (Fig. 3). The cover 5 is of the deep draw type wherein the cover body portion 10 is arranged to extend deeply axially inwardly into the wheel upon which the cover may be mounted, and in order to emphasize this depth, it is desirable to have the outer marginal portion 8 of the cover disposed in substantial axially outward spaced relation to the tire rim of the wheel. Furthermore, such a deep draw cover embodies substantial weight which imposes more stringent requirements upon the cover retaining flange 7 for retaining the cover on the wheel than would be true with a lighter weight cover, so that it is desirable to increase the resilient stiffness of the retaining flange. It is for that purpose that the rib 11 which is preferably formed as a substantially continuous annular radially outwardly projecting rib, is provided.

However, provision of the rib 11 is substantially complicated by the limited working distance available between the retaining flange 7 and the body portion 10 of the cover since the body portion 10 extends generally axially inwardly in radially inwardly spaced relation to the flange 7 and substantially axially inwardly therebeyond. This affords little room between the flange 7 and the body portion 10 of the cover for operation of metal working tools by which the rib 11 may be produced. Ordinarily such a rib 11 might be rolled. But in this instance there is not enough room to accommodate rolling dies between the flange 7 and the cover body 10.

According to the present invention, the cover retaining flange rib 11 is produced by pressing the same between reciprocably operable forming dies including a set of circumscribing backup die members 12 (Figures 1 and 3) and a cooperating set of reciprocably mounted rib pressing die members 13 generally complementary to the backup die members. The backup die members 12 are mounted and arranged to engage the radially outer side of the cover retaining flange 7 while the rib pressing die members 13 are operable inside the flange 7 toward the backup die members 12.

By preference, both of the sets of die members 12 and 13 are operatively supported upon a common base plate or block or bed member 14 adapted to be secured operatively upon the anvil or bed of a die press (not shown). Supporting the preferably flat base backup die members 12 is a flat bearing plate 15 secured on top of the base block 14. On the other hand, the rib pressing die members 13 are preferably provided with flat bottom portions that are slidably mounted upon an upwardly facing bottom wall within a recess 17 in the base plate or block 14 concentric with a central cylindrical opening 18 in the bearing plate 15. In Figure 1 the respective sets of die members 12 and 13 are shown as they are related at the end of a rib pressing operation thereof, that is, disposed in complementary, cooperating relation just before release thereof to return to the separated or expanded or open condition of the die members. It will be observed that the die members 12 are, in this operating condition thereof, mutually related to provide a continuous encompassing wall or backup perimeter for the radially outer face of the cover flange 7. For accurately determining the size of the closed perimeter defined by the die members 12, they are provided with radially extending and circumferentially facing abutting side surfaces 19 adjacent to the inner perimeter defined by the backup die members while extending toward the radially outer sides of the respective backup die members are respective lateral guide flanges 20 which at the opposite sides of each of the backup die members are parallel and provided along the lower portions of these die members for slidable engagement within respective undercut gib grooves 21 of, in the present instance, generally triangular gib plates 22 appropriately secured for this purpose upon the bearing plate 15. Normally the backup die members 12 are urged or biased into inactive backed off position against respective stop arms 23 secured to project upwardly into the path of the backoff die members at the radially outer side of the bearing plate 15. The biasing means preferably comprises a pair of parallel spaced compression springs 24 for each of the die members 12 mounted within upwardly opening generally radially outwardly extending parallel grooves 25 in the upper portion of the bearing plate 15 with the radially inner ends of the springs thrusting against inner end walls of the grooves while the radially outer ends of the springs thrust against respective depending pins 27 carried by the die members 12. By providing a pair of the springs 24 the thrust load is better distributed and individually smaller diameter springs may be used for imparting the desired return thrust bias for the respective die members 12.

Each of the rib pressing die members 13 is preferably constructed as a reciprocably slidably mounted upstanding arcuate flange of a segmental size adequate to co-operate with the other rib forming die members 13 of the set to provide as nearly as practicable a continuous perimeter complementary to the inner die perimeter defined by the backup die members 12 in the closed, cover flange backing up condition of the backup die members. To this end, the rib pressing die members 13 have circumferentially facing sides 28 which in the expanded rib pressing relationship thereof are separated by only so much of a gap as will enable the rib pressing die members 13 to be backed off into non-operating or inactive position sufficiently to clear the same relative to the cover flange, and in which relationship the side surfaces 28 will abut.

For normally biasing the die members 13 into the inactive position respective pairs of biasing compression coil springs 29 are provided which are disposed in balanced relationship within spring sockets 30 respectively provided in guide tail radial extensions 31 slidably guidingly disposed in radial respective guide recesses 32 leading radially off from the rib pressing die member accommodating recess 17 in the upper portion of the supporting bed block 14. In hold down relation over the guide recesses 32 is the bearing plate 15. The biasing springs 29 thrust against the radially inwardly facing surface defining the recesses 32 and against the base portions of the bores defining the sockets 30 and are loaded normally to urge the die members 13 toward the center of the die assembly and thus into the limit of radially inward movement of the die members 13 defined by engagement of the opposing complementary side faces 28 thereof.

At the start of a ribbing operation, the circular cover member 5 is placed in position as shown in Figure 2 by engaging a radially inwardly directed flange portion 33 at the axially inner extremity of the axially inwardly extending body portion 10 upon a circumferentially spaced upwardly projecting series of supporting pins 34 respectively supported upon biasing compression springs 35 in bores 37 in the base member 14 and projecting upwardly within the recess 17. In this position of the cover member 5, the upper portions of the ribbing die members 13 are located between the retaining flange 7 of the cover member and the body portion 10, with the radially inner faces of the die members 13 serving generally as centering means for opposingly cooperating with the cover body 10. As thus disposed, the radially inner side of the cover flange 7 freely opposes a ribbing nose or bead or rib 38 on the upper end portion of each of the die members 13, projecting radially outwardly therefrom and of a cross-sectional shape substantially the same as desired in the groove at the inside of the rib 11 to be formed in the flange 7. The ribbing beads or ribs 38 of all of the die members 13 are concentrically aligned and the opposite ends thereof extend to the circumferential end surfaces 28 of the die members.

Each of the backup die members 12 has the inner perimeter thereof provided with a ribbing groove 39 which is generally complementary to the opposing ribs 38 of the rib forming dies 13 but preferably of somewhat greater depth, as best visualized in Figure 3, for working the material of the flange 7 in the rib 11 thereof over the pressing or shaping ribs or beads 38 of the dies 13. In the inactive or backed off position of the die members 12, the inner peripheral surfaces thereof are located in sufficient clearance relation to the cover flange 7 to enable free movement thereby of generally radially and axially outwardly turned retaining terminal flanges 40 on axially inward retaining finger extensions of the flange 7.

After the cover member 5 has been placed in position upon the pins 34, a punch die assembly including a head block or plate 41, carried by a press ram (not shown) is moved down into operative relation to the rib forming die assembly to cause the cover 5 to be moved into proper position relative to the die ribs 38 and the ribbing grooves 39, and to cause the die members 12 and 13 to operate to form the cover flange rib 11. To this end, the punch die assembly includes spring biased presser ring member 42 for engaging with the intermediate cover portion 9 and carrying an extension presser ring 43 for engaging the inner cover flange 33 and the cover body 10 as the punch die assembly is depressed to thereby depress the cover 5 on the spring biased supporting pins 34 until the outer extremity of the marginal flange structure 8 of the cover bears against the tops of the backup die members 12. As this occurs, respective cam driving punch members 44 carried in fixed relation by the die head 41 engage with respective driving cam surfaces 45 thereof against complementary outer end generally upwardly and outwardly facing cam surfaces 47 on the backup die members 12 and drive the die members 12 radially inwardly against the bias of their return springs 24 into backing up abutment with the opposing surface areas of the cover flange 7. Thereupon the retaining terminal flanges 40 of the retaining flange fingers of the cover are accommodated in respective circumferentially aligned under cut or inset grooves 48 in the inner faces of the backup die members 12 below the upper portion of such faces having the ribbing groove 39 therein, as best seen in Figure 3.

In coordinated sequence as the punch die assembly descends in a rib forming stroke, a rib die driving cam member 49, preferably in the form of a ring structure fixedly carried by the central portion of the head 41, engages by means of a downwardly and outwardly facing lower end portion cam surface 50 thereon respective complementary inwardly and upwardly facing cam surfaces 51 on radially inwardly directed cam tails 52 on the respective die members 13.

The construction and relationship of the driving punches 44 and 49 is such that as the ribbing die members 13 are driven by the cam punch 49 into rib forming relation to the cover flange 7, the backup cam driving punch members 44 enter into solid backup relation to the backup die members 12. For this purpose respective vertical flat faces 53 at the inner sides of the cam punch members 44 enter into slidable backup engagement with complementary vertical backup faces 54 below the cam surfaces 47 of the die members 12. At the same time, the lower nose portions of the respective punch members 44 engage in slidable relation at their outer vertical surfaces with hardened backup blocks 55 carried by respective upstanding bosses 57 in the present instance located adjacent the respective corners of and integral with the base plate or block 14. The bosses 57 are also provided with upwardly opening guide bores 58 respectively receptive of guide pins 59 carried by the head plate or ram block 41 on depending integral boss portions 60 which serve to backup the upper portions of the punch cam members 44. Thereby the backup die members 12 are held quite firmly in backup relation against the cover flange 7.

Then, as the punch die assembly continues to descend, the interengaging cam faces 50 thereof and the cam faces 51 of the rib pressing die members 13 react to drive the rib pressing die members 13 radially outwardly to cause the forming ribs 38 of the die members 13 to drive the opposing portion of the cover flange 7 into the forming groove 39 in the backup die members. As the material of the cover flange 7 is bent and worked into the rib 11, the lower portion of the flange 7 is drawn up into the position shown in Figure 3 to compensate for the corrugation-like bending radially outwardly of the rib 11 in the cover flange. By thus working the material going into the rib 11 by means of the tongue 38 and groove 39 structure of the dies, additional hardness and thereby resilience is imparted to the cover flange 7, in addition to the stiffness imparted by the formed rib 11.

It will be observed that even though the forming portions of the rib pressing die members 13 project substantially upwardly and are of necessarily limited radial dimension in order to clear into the limited space between the cover body 10 and the retaining flange 7, cantilever force which might tend to upset or cant the die members as they are driven against the cover flange 7 in the rib forming stroke thereof is effectively counteracted by the sliding engagement of the upper faces of the radially outwardly projecting guide noses or flanges 31 of the forming die members against the overlying bearing plate 15.

It may also be noted that the presses die ring 42 is reciprocably guided slidably between the outer vertical periphery of the die actuating punch member 49 and a radially outer encircling retainer ring 61 carried fixedly by the punch head 41. Advantage is also gained from having the junctures between the respective sets of die members 12 and 13 relatively offset so that the joints of one set are intermediate the joints of the other set.

Upon backing off of the punch assembly the rib forming die members 13 and then the backup die members 12 are backed off, to clear the formed flange rib 11, by action of the respective biasing springs as the punch cam members release the die members. Then the hold-down die ring members 42 and 43 back off and the supporting pins 34 lift the cover up for easy engagement of the marginal flange structure 8 thereof above the backup die members 12 for removal from the die assembly and replacement by another cover member to have the retaining flange thereof provided with the rib 11.

It will be understood that modifications and variations may be effected without departing from the scope of the novel concepts of the present invention.

I claim as my invention:

1. In apparatus for providing a circular wheel cover having a substantially cylindrical cover retaining flange with a radially outwardly projecting annular rib formation in such flange and wherein the cover has an axially inwardly projecting portion in limited clearance relation to said flange, means supporting in generally radially reciprocable relation a series of backup die members arranged to provide a continuous radially inwardly facing annular perimeter opposing said flange and in backup relation to the radially outer side of said flange, with aligned grooves in the inwardly facing flange-opposing faces of the die members, a series of annularly arranged rib forming die members having base portions supported by said supporting means and upstanding generally circumferentially arcuate portions receivable in said limited clearance between said cover flange and said cover portion, depressible stripper means located inwardly of and adjacent to said rib forming die members for supporting a cover member in normally spaced relation above said rib forming die members while they are in said limited clearance spacing and with the cover flange depending between said sets of die members, said rib forming die members having ribbing projections thereon cooperable to drive a rib from said cover flange into said backup die groove, a punch mechanism cooperable with said sets of die members to drive said backup die members into engagement with said cover flange and sequentially thereafter the rib forming die members into engagement with the cover flange to press a rib from said cover flange into said groove, and means located on said punch mechanism for pressing the cover down in opposition to said stripper means toward said sets of die members and to locate the depending cover flange in proper relation to the groove and rib portions of the opposing die members in advance of the driving action of the die operating means of the punch mechanism.

2. Apparatus as defined in claim 1, wherein said depressable stripper means comprise a series of circumferentially spaced pins upstanding from the supporting means, and said pressing means comprise a ring shaped pressing member carried by said punch mechanism and yieldably reciprocable thereon to enable movement of the punch mechanism beyond a stop position of the ring member in pressing engagement with the cover and toward said pins.

3. In combination in die apparatus for pressing a radially outwardly projecting and circumferentially extending rib in an axially projecting marginal cover retaining flange of a circular wheel cover having a body structure provided with a portion spaced radially inwardly from the retaining flange and extending axially in radially facing opposition thereto and defining between the flange and said body portion a downwardly opening annular groove, a lower die assembly receptive of the cover in an upwardly facing position of the cover and including a set of radially reciprocably movable back-up die members having radially inwardly facing back-up faces normally located on a diameter larger than said cover flange and said faces having rib forming grooves therein opening radially inwardly, a set of radially reciprocable rib pressing die members carried by said lower die assembly each of which has a base portion comprising a radially outwardly guide tail extension and a radially inwardly projecting cam tail extension having on its radially inner end a generally upwardly facing sloping cam surface, each of said rib pressing die members having between said tail extension thereof a respective upstanding pressing portion provided with a radially outwardly projecting rib forming bead on its upper extremity complementary to the opposing groove of the back-up die members, said upstanding portion being of a radial dimension to fit up into the cover groove when the cover is placed concentrically over said upstanding portions with the cover retaining flange extending down between said back-up die members and said upstanding portions, said lower die assembly having means providing guide recesses for said radially outwardly projecting tail extensions and means in said recesses normally urging the rib pressing die members radially inwardly to a limit position wherein the ribbing beads of the rib pressing die members are on a diameter clear of the inside diameter of the cover flange, said radially inwardly projecting cam tail portions extending to a radially inward position beyond a radially inner diameter of the cover so as to be clear of the same, and an upper die assembly including means for actuating the same reciprocably relative to said lower die assembly and including means for respectively actuating said sets of die members to coact on said cover flange to press said rib therein, said actuating means including a cam punch structure movable axially downwardly through the inner-diameter of the cover positioned over the die members and including a cam surface engageable with the cam surfaces of the cam tail portions of said rib forming die members to drive the rib forming die members radially outwardly to thereby press the ribbing beads thereof into the cover flanges and into the complementary grooves of the back-up die members.

References Cited in the file of this patent
UNITED STATES PATENTS

| | | |
|---|---|---|
| 1,457,579 | Kranz | June 5, 1923 |
| 1,556,847 | Kranz | Oct. 13, 1925 |
| 1,774,809 | Mulbach | Sept. 2, 1930 |
| 1,812,045 | Groehn et al. | June 30, 1931 |
| 2,101,888 | Ambrosius | Dec. 14, 1937 |
| 2,198,873 | Hinsdale | Apr. 30, 1940 |
| 2,358,984 | Lyon | Sept. 26, 1944 |
| 2,473,836 | Wixon et al. | June 21, 1949 |
| 2,626,581 | Almgren et al. | Jan. 27, 1953 |

FOREIGN PATENTS

| | | |
|---|---|---|
| 17,945 | Great Britain | July 30, 1897 |